(12) United States Patent
Isaksen et al.

(10) Patent No.: US 7,500,995 B2
(45) Date of Patent: Mar. 10, 2009

(54) METHOD FOR PRODUCTION OF NITRATE-CONTAINING PRODUCTS FROM UNDERCOOLING MELTS

(75) Inventors: Jan Birger Isaksen, Porsgrunn (NO); Lars Moland, Rådal (NO); Torstein Obrestad, Ulefoss (NO)

(73) Assignee: Yara International ASA, Oslo (NO)

( * ) Notice: Subject to any disclaimer, the term of this patent is extended or adjusted under 35 U.S.C. 154(b) by 733 days.

(21) Appl. No.: 10/533,417

(22) PCT Filed: Nov. 1, 2002

(86) PCT No.: PCT/NO02/00400

§ 371 (c)(1),
(2), (4) Date: Aug. 26, 2005

(87) PCT Pub. No.: WO2004/039722

PCT Pub. Date: May 13, 2004

(65) Prior Publication Data

US 2006/0013755 A1    Jan. 19, 2006

(51) Int. Cl.
*C01F 11/32* (2006.01)
(52) U.S. Cl. .................................. 23/308 R; 23/295 R
(58) Field of Classification Search ............... 23/380 R, 23/295 R
See application file for complete search history.

(56) References Cited

U.S. PATENT DOCUMENTS 4,569,677 A    2/1986    Calis et al.

FOREIGN PATENT DOCUMENTS

| | | |
|---|---|---|
| CS | 36403 | 6/1931 |
| CS | 43500 | 4/1933 |
| GB | 392531 | 5/1933 |
| GB | 510053 | 7/1939 |
| GB | 768040 | 2/1957 |
| WO | 00/02831 | 1/2000 |
| WO | 01/83374 | 11/2001 |

OTHER PUBLICATIONS

Miroslav Trojan, Textbook entitled "Selected Chapters of the Inorganic Technology", p. 82, 1991.

*Primary Examiner*—Edward M Johnson
(74) *Attorney, Agent, or Firm*—Wenderoth, Lind & Ponack, L.L.P.

(57) ABSTRACT

The invention concerns a method for the production of nitrate containing products (fertilizers, technical products) from undercooling melts, wherein a XN—water solution is evaporated up to a content of 50-99.8 weight % XN, where X is one or more selected from Ca, Mg, NH, Na and K, and N means nitrate. The preferred range of XN is 70-99.5 weight %. The melt is cooled down to and kept at a temperature at or below the crystallisation point and finely divided solid XN powder consisting of the equilibrium phases is added to the melt. Melt drops are then formed and allowed to cool and solidify during up to 70 seconds. It is preferred to use a cooling belt for solidification of the particles. The belt is cooled by air, water, oil or another medium.

11 Claims, 1 Drawing Sheet

METHOD FOR PRODUCTION OF NITRATE-CONTAINING PRODUCTS FROM UNDERCOOLING MELTS

Figure 1:
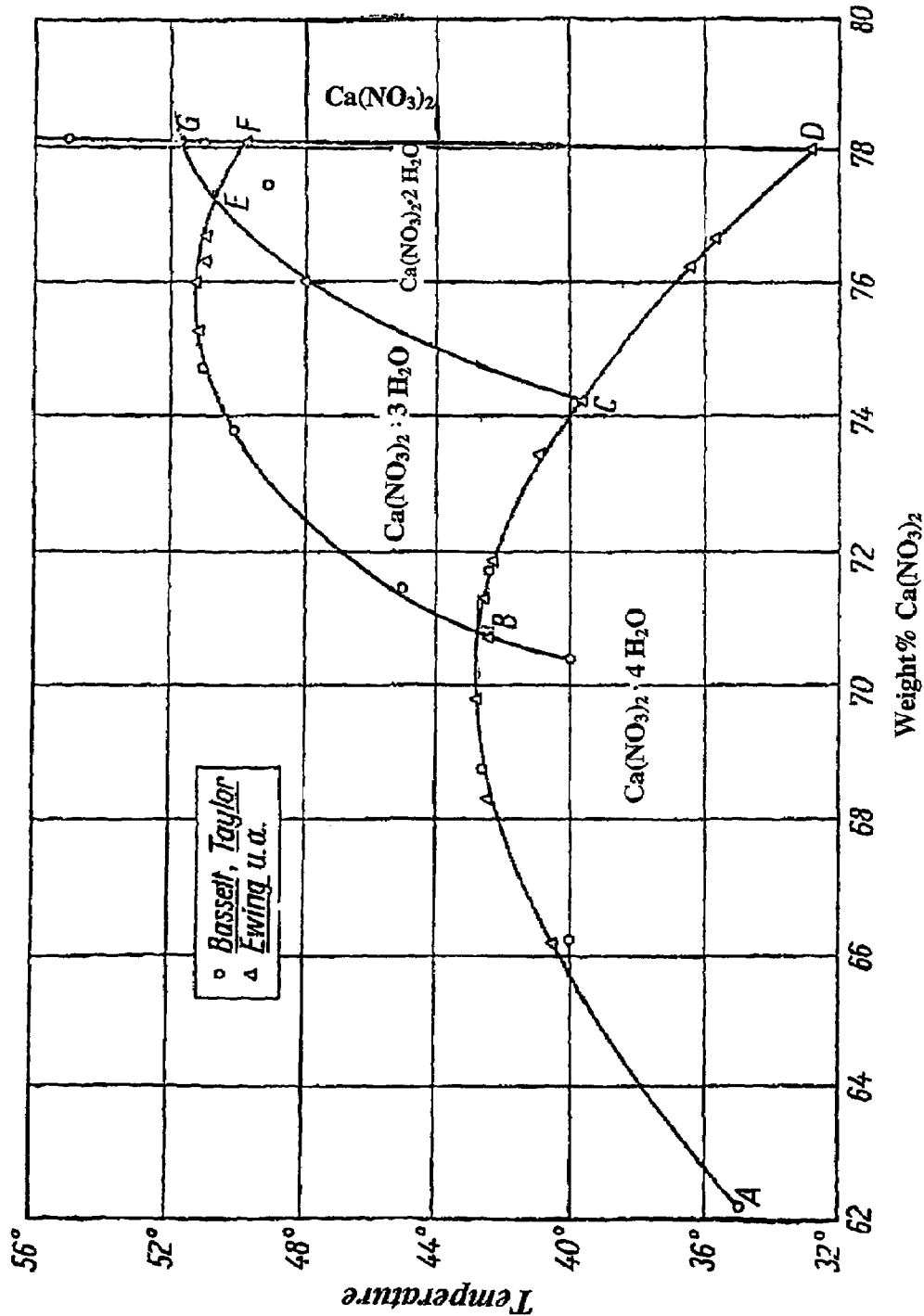

The invention concerns production of nitrate-containing products (fertilizers, technical products) from undercooling melts.

Pure CN ($Ca(NO_3)_2$) melts at 560° C. and this very high temperature is inconvenient for particulation. In order to use devices like centrifugal or nozzle prilling equipment or pan/drum granulators, the CN melt has to have compositions that contain 5-8 weight % ammonium nitrate (AN). Today, all prilled or granulated CN contains this amount of AN in addition to 14-16 weight % water (crystal water). If the ammonium nitrate content is removed from the melt, the composition undercooles to such an extent that prilling/granulation is not possible.

There is still a need for CN without AN and it is desirable to find methods to produce CN-water solid easily, in large quantities.

From British Patent No. 392 531 it is known a process for production of distributable and non-caking fertilizers containing calcium nitrate. According to this patent, a calcium nitrate/water solution is evaporated to a sandy-pasty consistency in which it contains about 90-95 weight % calcium nitrate (calculated as anhydrous calcium nitrate). Thereafter the concentrated product is converted without any substantial further concentration, into granular form by mechanical dis-aggregation in bulk at a temperature of 50-100° C. This method gives salt deposits on equipment and a flaked, dusty product. The method is therefore considered not well suited for large-scale production of CN.

From a CN-water solution $CN*4H_2O$ crystals can be obtained in crystallization processes well described in the literature. Such crystals are available in the markets. Such crystals contain 69-70 weight % CN, but normally they have a high caking tendency and over time they become hard and difficult to handle. Thus, it is not desirable to make a crystalline material.

By mapping the phase diagram (from Gmelin) of the system CN-AN-Water, it has been possible to find a rather narrow melt composition region that can be particulated with ordinary plant equipment and today granulated or prilled CN contains 77-80 weight % CN, 5-8 weight % AN and 15-17 weight % water.

By studying the phase diagram of CN-water (FIG. 1) it can be seen that the following solid compounds can be formed in the system:

$Ca(NO_3)*4H_2O$
$Ca(NO_3)*3H_2O$
$Ca(NO_3)*2H_2O$
$Ca(NO_3)_2$

Further, it can be realized that according to the CN-water system, all CN concentrations above 70 weight % should solidify, meaning that all liquid should have disappeared at equilibrium if temperature is below 40-43° C. Further, it can be seen that by cooling a CN-water solution with CN less than 70 weight %, $CN*4H_2O$ crystals will be formed.

The object of the invention is to obtain a method to produce high quality solid CN-water particles easily, in large quantities. Another object is to obtain a production method that could be applied generally for nitrate containing salts that very often tend to form super cooling melts.

These and other objects of the invention are obtained with the method as described below, and the invention is further defined and characterised by the accompanying patent claims.

The invention thus concerns a method for the production of nitrate containing products (fertilizers, technical products) from undercooling melts, wherein a XN-water solution is evaporated up to a content of 50-99.8 weight % XN, where X is one or more selected from Ca, Mg, $NH_4$, Na and K, and N means nitrate. The preferred range of XN is 70-99.5 weight %. The melt is cooled down to and kept at a temperature at or below the crystallisation point and finely divided solid XN powder consisting of the equilibrium phases is added to the melt. Melt drops are then formed and allowed to cool and solidify during up to 70 seconds, preferably 20-70 seconds. It is preferred to use a cooling belt for solidification of the particles. The belt is cooled by air, water, oil or another medium.

The melt temperature is preferably kept 0-10° C. below the crystallization point of the melt. When calcium nitrate particles are produced, $CN*2H_2O$ and $CN*3H_2O$ are used as seed particles. The particles formed have a particle size between 0.2 and 0.8 mm, preferably between 0.4 and 0.6 mm. Particles could be made from a melt consisting of 74 weight % calcium nitrate, 14 weight % potassium nitrate and 12 weight % water. Solid particles can also be produced consisting of a homogenous mixture of nitrates, chlorides and crystal water. An example of this is particles made from a melt consisting essentially of 50 weight % calcium nitrate, 4 weight % ammonium nitrate, 26.5 weight % calcium chloride and 18-20 weight % water.

Several experiments were carried out in order to try to make particles of the melts.

EXAMPLE 1

Granules (For Comparison)

CN-water solutions were evaporated to above 70, 75 and 78 weight % CN.

The various melts were sprayed onto a rotating laboratory pan granulator containing solid NH—CN (calcium nitrate from Norsk Hydro ASA) in various ratios and at various temperatures.

None of the trials succeeded as the liquid/melt did not solidify. The whole matrix (solid CN+melt) turned into a sticky slurry that could not be processed with liquid/solid ratios within acceptable limits.

EXAMPLE 2

Prills (For Comparison)

Melts with the CN concentrations mentioned above, were kept at temperatures close to the crystallization point given by the literature. Finely crushed NH—CN were mixed into the melt subsequent to pumping the melt at high pressure to nozzles where drops were formed and allowed to cool down to 20° C. for 5-10 seconds.

As cooling medium oil and air were tried. Solid particles did not form due to under-cooling.

EXAMPLE 3

Making Pastilles

Trial 1 (For Comparison):

Droplets of CN-melts with CN concentrations above 70, 75 and 78 weight % pure CN where allowed to cool on a chilled metal plate down to 10° C. for several minutes. The melt-drops turned into viscous, sticky liquid, solid particles did not form.

Trial 2 (For Comparison):

Same procedure as above but now finely divided solid CN powder was added to the melt before setting the droplets on the plate. Solids of NH—CN and crushed CN*$4H_2O$ crystals were applied.

The melt-droplets turned into slurries with no particle strength as they cooled down.

Trial 3 (According to the Invention):

CN melt having 23 weight % water and 77 weight % CN were allowed to cool on a plate for 48 hours at 20° C. A white solid material was formed during this time Now clearly the melt had turned into a strong solid material over these hours and X-ray analysis showed that the material consisted of CN*$2H_2O$ and CN 3*$H_2O$.

However, the solidifying time was too long for a convenient particulation process.

Trial 4a (According to the Invention):

Same procedure as in trial 1, but now a CN-melt consisting of 23 weight % water and 77 weight % CN was cooled down to 50-55° C. and 2 weight % crushed material from trial 3 was thoroughly mixed into the melt.

As the drops cooled, crystals were formed and during-30-70 second hard pastilles were formed with particle strength above 1 kg. As time passed, particle strength became substantially higher.

Particles did form with this procedure and the crucial part of this procedure was obviously to add finely divided solid material consisting of the equilibrium phases of the system at room temperature. (CN*$2H_2O$ and CN*$3H_2O$)

Trial 4b (According to the Invention):

Same procedure as trial 4a but now melt composition was 25 weight %/75 weight % and 21.5 weight %/78.5 weight % ($H_2O$/CaN).

Trial 5 (According to the Invention):

Same procedure as in Trial 4, after reducing the temperature of the melt (23% weight % $H_2O$/77% weight % CN) to approximately 45° C. the finely divided solid material was mixed in as seeding particles. As crystals started to form in the beaker, drops were allowed to fall on the cooling plate and simultaneously pure melt (23 weight %/77 weight %) with temperature below 50° C. was added to the beaker, while stirring.

In this way drops containing solid crystals with the right composition were continuously formed and solidified on the metal plate just by adding one portion of solid material to make the crystallization start.

However, 40-70 seconds are too long time for using a granulation or prilling technique with an acceptable recycling ratio.

To use procedure 5 for producing large quantities of particles, a way of obtaining 40-70 second crystallization time was looked for.

EXAMPLE 4

Making CN Pastilles in Industrial Scale (According to the Invention)

Experiments were carried out on a moving steel cooling belt (as described in U.S. Pat. No. 5,326,541) that is kept at a low temperature by using water as cooling agent. On this belt a rotating drum with nozzles, supply drops that can solidify on the belt. A plant test was carried out with CN melt (23 weight %/77 weight %).

By using procedure described in "Trial 5", several hundred kg of CN particles (pastilles) were produced on the cooling belt.

EXAMPLE 5

Making MgN Pastilles (According to the Invention)

Trial 5 in Example 3 was repeated by replacing CN melt with 1: MgN-water melt having composition 67 weight % MgN and 33 weight % $H_2O$ (boiling point 180° C.) and 2: MgN-water melt with composition 58 weight % MgN and 42 weight % (boiling point 155° C.). Both melt 1 and 2 were cooled down to 30° C. by procedure mentioned in trial 5 (Example 3). Letting composition 1 and 2 solidify in an exsiccator for 3 days, and then crush the solids formed into a fine powder made seeding material.

With melt 1 and 2 and the procedure described we obtained MgN*$4H_2O$ and MgN*$6H_2O$ respectively. MgN*$6H_2O$ was made also without seeding material as the MgN*$6H_2O$ melt very easily solidified.

EXAMPLE 6

Making Pastilles of MGN-AN and CN (According to the Invention)

A melt consisting of 67 weight % CN, 4.0 weight % AN, 10 weight % MgN and 20 weight % water was held at 110° C. The melt was cooled down to 65° C. and seeding material thoroughly mixed in as drops were allowed to fall on a cold metal plate.

During 60 seconds on the plate hard pastilles were formed. Letting the melt composition crystallize in an exsiccator for 2-3 days and then grinding to a fine powder made seeding material.

EXAMPLE 7

Mixture of CN, AN and $CaCl_2$ (According to the Invention)

A melt consisting of 50 weight % CN, 4 weight % AN, 26.5 weight % $CaCl_2$ and 18-20 weight % water was made by melting a mixture of NH—CN and $CaCl_2$*$2H_2O$ (130-140-C).

By using procedure described in 4 b (seeding material added at 120° C.) nice particles were formed within 30 seconds on a cold steel plate. The particles consisted of homogenously solidified CaN-AN $CaCl_2$ particles.

EXAMPLE 8

Mixture of CN and KN (According to the Invention)

A melt consisting of 74 weight % CN, 14 weight % KN and 12 weight % water was made, by evaporating water from a CN—KN—$H_2O$ solution. The melt temperature was reduced to 86° C., app. 5-6° C. above crystallization point. 3 weight % finely grained seed material was thoroughly mixed in and droplets allowed falling on to a cold metal plate (23° C.).

During 50-60 seconds hard pastilles/particles formed on the plate.

The right seeding material was made by letting the melt composition crystallise in an exsiccator over 2-3 days and then grind to powder the solid formed.

Thus, by applying:
correct melt or CN-water composition
correct temperature of the melt (at or below cryst. point)
correct seeding material (consits of equilibrium phases of the solidifying material)
a cooling belt or a similar system that allows 20-70 seconds or more for crystallization, it has been possible to find a procedure for producing solid CN particles (CN+crystal water) without AN. The procedure can be applied for making solids of several nitrate systems containing Ca, Mg, K, Na, $NH_4$ or mixtures of these nitrates or mixtures of nitrates and chlorides.

The invention claimed is:

1. Method for the production of nitrate containing products (fertilizers, technical products) from undercooling melts, wherein a XN—water solution is evaporated up to a content of 50-99.8 weight % XN, where X is one or more selected from Ca, Mg, $NH_4$, Na and K, N is nitrate, the melt is cooled down to and kept at a temperature at or below the crystallisation point, finely divided solid XN powder consisting of the equilibrium phases is added to the melt, where after melt drops are formed and allowed to cool and solidify during up to 70 seconds.

2. Method according to claim 1, wherein the content of XN is 70-99.5 weight %.

3. Method according to claim 1, wherein a cooling belt is used for solidification of the particles.

4. Method according to claim 3, wherein the belt is cooled by air, water oil or another medium.

5. Method according to claim 1, wherein the melt drops are cooled and solidified during 20-70 seconds.

6. Method according to claim 1, wherein the temperature is kept preferably 0-10° C. below starting crystallization point of the melt.

7. Method according to claim 1, wherein calcium nitrate is produced and $CN*2H_2O$ and $CN*3H_2O$ are used as seed particles.

8. Method according to claim 1, wherein particles are formed with particle size between 0.2 and 0.8 mm, preferably between 0.4 and 0.6 mm.

9. Method according to claim 1, wherein particles are made from a melt consisting of 74 weight % calcium nitrate, 14 weight % potassium nitrate and 12 weight % water.

10. Method according to claim 1, wherein solid particles consisting of a homogenous chemical mixture of nitrates, chlorides and crystal water were produced.

11. Method according to claim 10, wherein solid particles are made from a melt consisting essentially of 50 weight % calcium nitrate, 4 weight % ammonium nitrate, 26.5 weight % calcium chloride and 18-20 weight % water.

* * * * *